(No Model.)
J. A. SULLIVAN.
Sewer Trap and Screen for Catch Basins.
No. 242,849. Patented June 14, 1881.
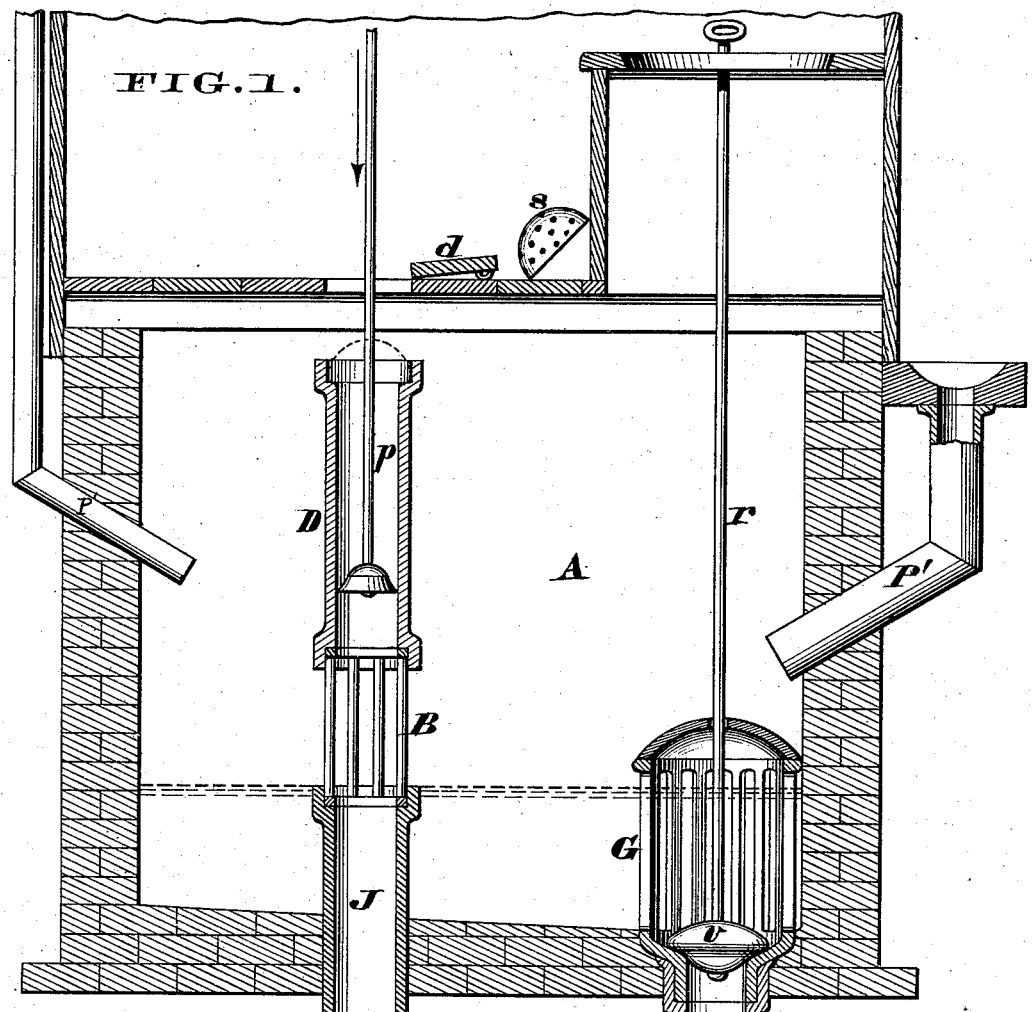
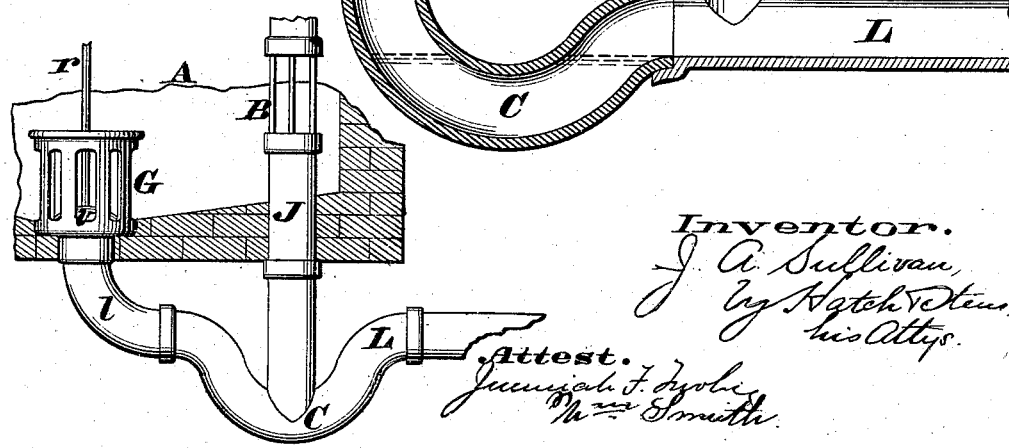

UNITED STATES PATENT OFFICE.

JEREMIAH A. SULLIVAN, OF CINCINNATI, OHIO.

SEWER-TRAP AND SCREEN FOR CATCH-BASINS.

SPECIFICATION forming part of Letters Patent No. 242,849, dated June 14, 1881.

Application filed November 11, 1880. (No model.)

*To all whom it may concern:*

Be it known that I, JEREMIAH A. SULLIVAN, of Cincinnati, Hamilton county, Ohio, have invented a new and useful Improvement in Sewer-Traps and Screens for Catch-Basins, of which the following is a specification.

The traps heretofore in use have been constructed of a number of joints, varying from three to six, and sometimes more, all having more or less curvature. When from any cause the pipes became clogged and it was rendered necessary to remove the obstruction, or it was found desirable to entirely empty the catch-basin, difficulty was encountered in the accomplishment of these objects by reason of the many curved joints of which the trap was constructed, the obstruction or sediment, notwithstanding the force applied, being unable to pass through the pipes to the sewer, and when the force was removed it would return again to its former place in the pipes or be forced into the catch-basin. To remedy this I have constructed a trap which will obviate this trouble, and which consists of a joint having but one simple curve sunk some distance below the bottom of the catch-basin, one end communicating with a pipe leading to the main sewer, and the other end attached to an upright joint which projects into the catch-basin and rises some distance from the bottom of the catch-basin. The bottom of the trap contains water, which rises to a level with the bottom of the joint communicating with the sewer, thus preventing any noxious gases from rising and entering the catch-basin.

My invention is illustrated in the accompanying drawings, in which Figure 1 represents a vertical sectional view, showing the catch-basin and the devices employed for emptying the same and cleaning the trap; and Fig. 2 represents a modification of the same.

A is the catch-basin; B, an ordinary grating for preventing obstructions from passing into joint J, leading to trap C. Over this grating is rigidly secured a pipe, D, into which, when it is desired to cleanse the trap or the pipe leading to the sewer, a plunger, *p*, is inserted. This plunger being removed when not in use, the screen *s* is placed on top of the pipe D, thus preventing any obstruction from passing in at the top, and also allowing an additional outlet for the fluid in case screen B should become clogged by any means. The door *d* is then closed, which prevents any stench arising from the catch-basin. The joint J is made to rise somewhat above the bottom of the catch-basin in order that water may remain in basin, liquefying the nuisance and preventing it sticking or remaining at the bottom.

G is a grating, which prevents any obstruction from entering the pipe L, communicating directly with the main sewer. The lower end of this grating is level with or sunk a little below the bottom of the catch-basin, and a valve, *v*, with an appropriate rod, *r*, inserted therein.

P' P' are waste-water pipes from the residence, which serve to always keep a sufficient amount of water in the catch-basin for the purpose heretofore named.

When it becomes necessary to cleanse the trap C, the plunger P is forced down into the pipe J and the sediment or other obstruction forcibly ejected into the sewer through the duct L, communicating with same, the valve *v* being in the meantime firmly secured, so that it cannot be forced up and the obstruction from the trap passed into the catch-basin by means of duct *l*. From the simplicity with which the trap and its attachments are constructed it will be seen that very little labor is required to effectually force the contents into the sewer, and that a great deal of expense heretofore incurred in the construction of these articles, and also their complexity, is done away with.

If occasion requires that the catch-basin itself should be entirely emptied, all that is necessary to be done is to raise the rod *r*, connected to the valve *v*, in screen G, and the contents flow out through duct *l* into pipe L, and from thence to the main sewer. The bottom of catch-basin is inclined to grating G, so that no force is necessary for the liquid to pass into sewer.

I am aware of the Reissue Patent No. 8,226; but the construction and arrangement of parts as shown in said patent do not constitute my invention, and are not claimed.

Having described my invention, what I claim as new, and desire to secure by Letters Patent, is—

1. The combination, with a catch-basin provided with a grating, G, of the trap C, connected at one end with the pipe L, which leads to the sewer, and having a joint, J, extending vertically within the catch-basin, and provided at its upper end with a grating, B, and with a pipe, D, serving to receive a piston, all substantially as shown and described.

2. The combination, with the catch-basin provided with a grating, G, of the trap C, arranged below the catch-basin and connected at one end with the pipe L, which communicates with the catch-basin by a duct, l, the opposite end of the trap being provided with a joint, J, extending vertically within the catch-basin, and provided at its upper end with a grating, B, and a pipe, D, serving to receive a piston, all substantially as and for the purpose described.

J. A. SULLIVAN.

Witnesses:
 WM. SMITH,
 J. F. TWOHIG.